(12) United States Patent
Mansfield et al.

(10) Patent No.: US 11,307,438 B2
(45) Date of Patent: Apr. 19, 2022

(54) UNIVERSAL CUSHION SUPPORT FOR PHOTOELASTIC MODULATOR

(71) Applicant: Hinds Instruments, Inc., Hillsboro, OR (US)

(72) Inventors: James C. Mansfield, Hillsboro, OR (US); John Freudenthal, Hillsboro, OR (US)

(73) Assignee: Hinds Instruments, Inc., Hillsboro, OR (US)

( * ) Notice: Subject to any disclaimer, the term of this patent is extended or adjusted under 35 U.S.C. 154(b) by 401 days.

(21) Appl. No.: 15/853,201

(22) Filed: Dec. 22, 2017

(65) Prior Publication Data

US 2018/0180906 A1   Jun. 28, 2018

Related U.S. Application Data

(60) Provisional application No. 62/439,849, filed on Dec. 28, 2016.

(51) Int. Cl.
*G02F 1/01* (2006.01)

(52) U.S. Cl.
CPC .......... *G02F 1/0102* (2013.01); *G02F 1/0131* (2013.01); *G02F 1/0136* (2013.01)

(58) Field of Classification Search
CPC ... A61B 5/0095; A61B 5/0059; A61B 5/0068; A61B 5/14542; A61B 8/4444; A61B 2090/306; A61B 5/0082; A61B 5/02007; A61B 5/14546; A61B 5/14552; A61B 5/415; A61B 5/418; A61B 5/444; A61B 5/4848; A61B 5/4866; A61B 8/00; A61B 8/06; A61B 8/485; A61B 2503/40; A61B 2503/42; A61B 8/4416; G02B 15/173; G02B 21/0028; G02B 21/008; G02B 6/12004; G02B 6/3885; G02B 6/4231; G02B 6/4249; G02B 6/428; G02B 6/4292; G02B 6/43; G02B 7/102; G02B 6/04; G02B 6/403
USPC ........ 359/237–239, 290–292, 298, 811, 813, 359/815, 822–824
See application file for complete search history.

(56) References Cited

U.S. PATENT DOCUMENTS

| | | | |
|---|---|---|---|
| 4,655,548 A | 4/1987 | Jue | |
| 4,792,930 A | 12/1988 | Kobayashi et al. | |
| 5,652,673 A | 7/1997 | Oakberg | |
| 6,208,808 B1 * | 3/2001 | DiRisio | G03B 17/02 359/819 |
| 6,906,844 B1 | 6/2005 | Siahpoushan | |
| 7,763,788 B2 | 7/2010 | Wachter | |
| 7,800,845 B2 * | 9/2010 | Mansfield | G02B 7/006 359/811 |
| 8,415,548 B2 | 4/2013 | Johansen | |

(Continued)

*Primary Examiner* — Brandi N Thomas
(74) *Attorney, Agent, or Firm* — Klarquist Sparkman, LLP

(57) ABSTRACT

An apparatus includes an elastically deformable optical element holder situated to receive an optical element having a plurality of holder contact surfaces, the optical element holder including a plurality of receiving portions adjacent to an aperture and corresponding to respective holder contact surfaces, each receiving portion displaceable through deformation of the optical element holder so that the optical element is insertable in the aperture so as to be cushionably supported in a predetermined position with the receiving portions in contact with the respective holder contact surfaces.

22 Claims, 6 Drawing Sheets

(56) References Cited

U.S. PATENT DOCUMENTS

| | | |
|---|---|---|
| 8,797,660 B1 | 8/2014 | Mansfield et al. |
| 2004/0055910 A1* | 3/2004 | Boorman ........... G11B 33/0422 |
| | | 206/308.1 |
| 2004/0075733 A1 | 4/2004 | Nebosis |
| 2004/0252947 A1 | 12/2004 | Liu et al. |
| 2008/0237299 A1 | 10/2008 | Vogler et al. |
| 2010/0067353 A1* | 3/2010 | Ochi ...................... H02K 33/18 |
| | | 369/112.23 |

* cited by examiner

UNIVERSAL CUSHION SUPPORT FOR PHOTOELASTIC MODULATOR

CROSS REFERENCE TO RELATED APPLICATION

This application claims the benefit of U.S. Provisional Patent Application No. 62/439,849, filed Dec. 28, 2016, which is incorporated by reference herein in their entirety.

FIELD

This application relates to holders for optical elements.

BACKGROUND

A photoelastic modulator ("PEM") is an optical device that is used for modulating the polarization of a beam of light. A PEM employs the photoelastic effect as a principle of operation. The term "photoelastic effect" means that an optical element that is mechanically stressed and strained (deformed) exhibits birefringence that is proportional to the amount of deformation induced into the element. Birefringence means that the refractive index of the optical element is different for different components of a beam of polarized light that propagates through the optical element.

A PEM includes an optical element, such as fused silica, that has attached to it a transducer for vibrating the optical element. The transducer vibrates at a fixed frequency within, for example, the low-frequency, ultrasound range of about 20 kHz to 100 kHz, and in some examples, higher frequencies. The mass of the element is compressed and extended along the axis of the optical element as a result of the vibration. The combination of the optical element and the attached transducer may be referred to as an optical assembly. The axis along which the optical element vibrates is referred to as the optical axis of the PEM.

The optical assembly is mounted within a housing or enclosure that normally includes apertures through which the light to be modulated is directed through the optical element in a direction generally perpendicular to the optical axis of the PEM. The housing supports the optical assembly in a manner that permits the optical element to be driven (vibrated) within it to achieve the above-noted photoelastic effect while at the same time holding the PEM in place.

PEMs are commonly used in measuring polarization properties of either a light beam or a sample. Many instruments use two or more PEMs to provide measurements of certain polarization properties. When two PEMs are used in a single instrument, they are typically arranged so that their optical axes are oriented to be 45 degrees apart (as considered in a direction perpendicular to those two optical axes). Examples of typical, two-PEM instruments include complete Stokes polarimeters, Tokomak polarimeters, and a number of other polarimeters and ellipsometers.

In the past, the mechanism for holding the optical element in the housing of the PEM used rigid barrel supports with grommet extensions to contact surfaces of the optical element. The rigid supports required additional machining steps and the grommets added parts and complexity to installation. Moreover, it has been found that the existing mechanism can have performance limitations. The resonant frequency and oscillation efficiency are sensitive to any mechanical coupling to the PEM housing so that an increase of such mechanical coupling decreases oscillation efficiency and absolute retardation and destabilizes resonant frequency. By decreasing post support rigidity, driving voltage for the PEM and/or power requirements can be significantly reduced. For instance, in some embodiments, the driving voltage can be reduced a third and power requirements by half.

SUMMARY

In some examples of the disclosed technology, an apparatus includes an elastically deformable optical element holder situated to receive an optical element having a plurality of holder contact surfaces, the optical element holder including a plurality of receiving portions adjacent to an aperture and corresponding to respective holder contact surfaces, each receiving portion displaceable through deformation of the optical element holder so that the optical element is insertable in the aperture so as to be cushionably supported in a predetermined position with the receiving portions in contact with the respective holder contact surfaces.

In further examples of the disclosed technology, methods can include inserting an photoelastic modulator optical element, having a plurality of holder contact surfaces, in an aperture of an elastically deformable optical element holder having a plurality of receiving portions adjacent to the aperture and respectively corresponding to the holder contact surfaces, the inserting including elastically displacing at least one of the receiving portions so that the receiving portions contact the respective holder contact surfaces and the optical element is cushionably supported by the optical element holder in a predetermined position.

The foregoing and other objects, features, and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Figure 1A:
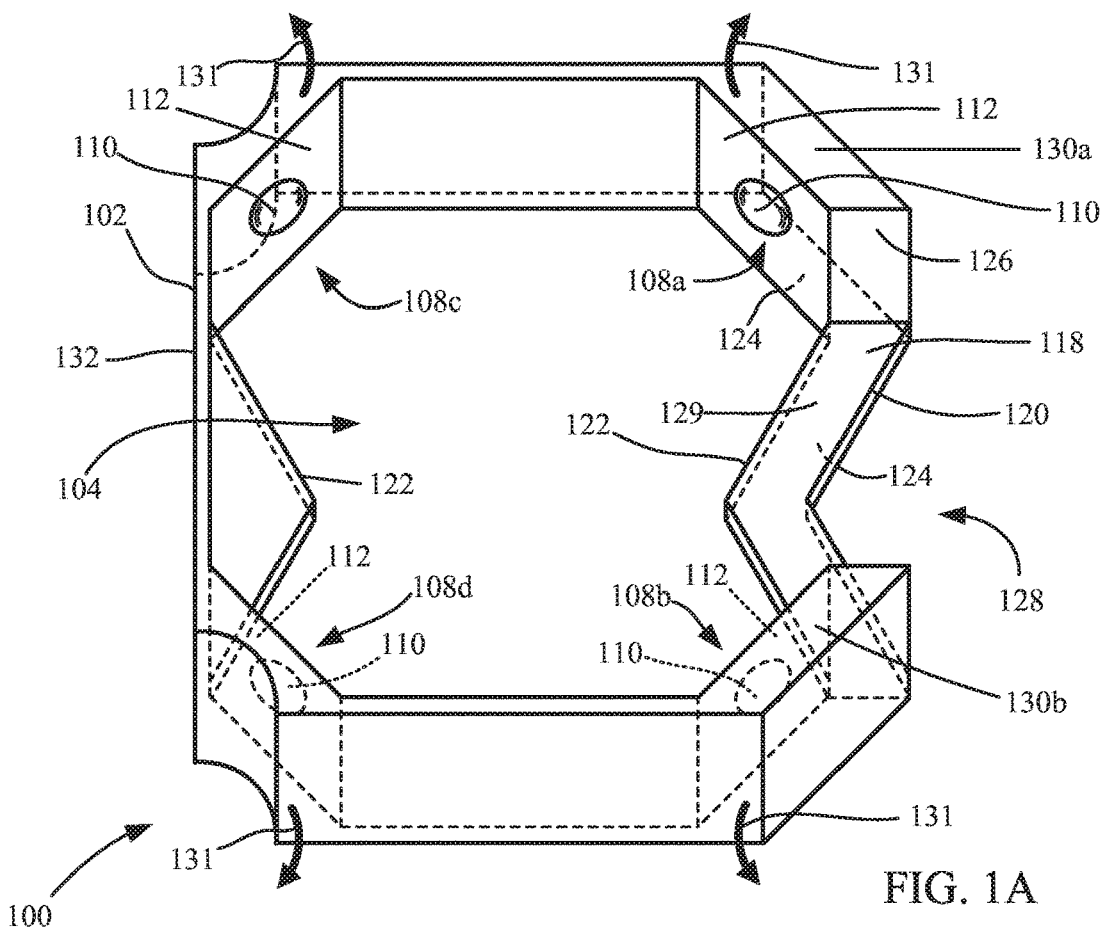
FIGS. 1A-1B are perspective views of a unitary elastic optical element holder.
Figure 1B:
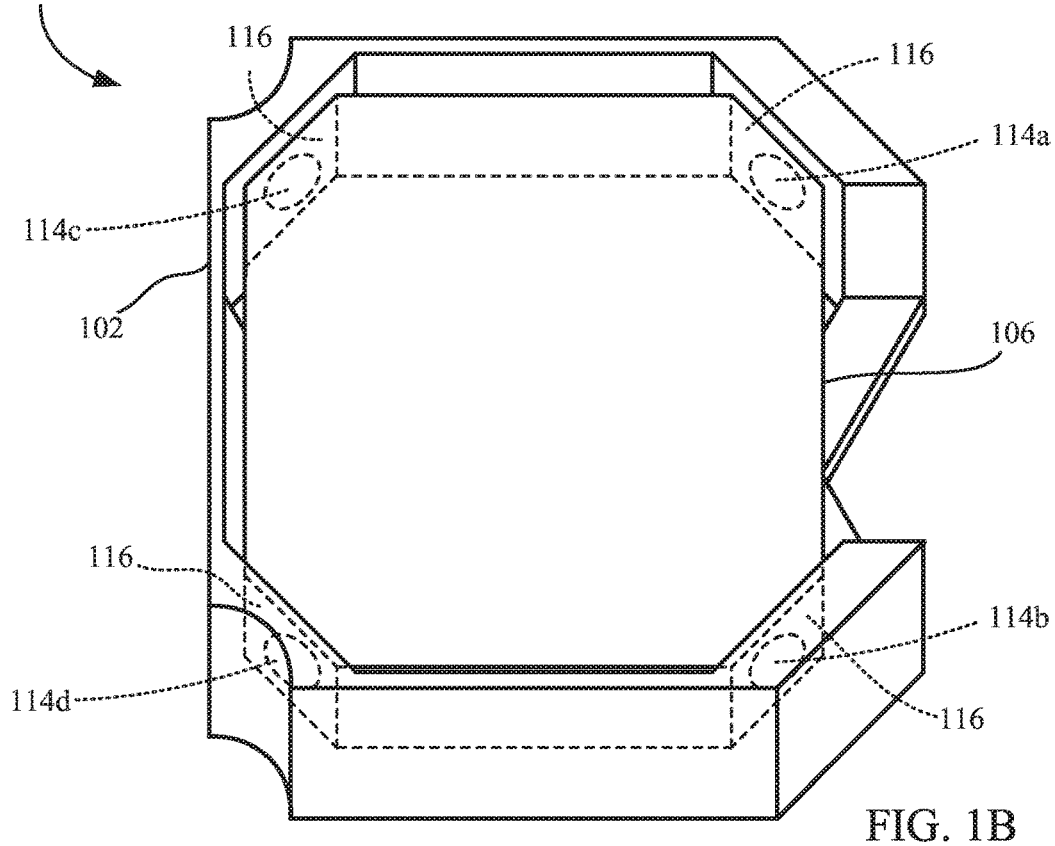

FIGS. 1A-1B are perspective views of an example unitary elastic optical element holder 100. In FIG. 1A, the optical element holder 100 is shown without the optical element 106, and in FIG. 1B, the optical element holder 100 is shown with the optical element 106. In FIGS. 1A and 1B, the example of the optical element holder 100 includes a unitary and elastic holder housing 102, or sleeve, formed of a suitable extrusion printable resilient thermoplastic elastomer material. In other examples, the holder housing 102 can be injection molded or waterjetted. The example holder housing 102 generally extends in the form of a square or ring, though various other shapes are possible, so as to provide a central region (cavity) 104 configured to define an aperture 105 that is sized to receive and, at one or more portions of the aperture 105, frictionally engage an optical element 106, such as a photoelastic modulator optical element. The holder housing 102 is typically deformable and resilient, with the thermoplastic elastomer typically having a hardness of about 90 A or less on a Shore A hardness scale. In some examples, the optical element holder housing 102 can include a plurality of portions that are affixed or in contact with each other to form the optical element holder 100.

The illustrated holder housing 102 includes a plurality of receiving portions 108 (also referred to specifically as 108a-108d) that are shaped to receive a feature of the optical element 106. As shown, four receiving portions 108 are situated in respective corners of a generally square or rectangular arrangement with each receiving portion 108 having a concave, spherical notch 110 located in an interior angled housing surface 112 of the holder housing 102. The optical element 106 includes a plurality of holder contact surfaces 114 (also referred to specifically as 114a-114d) that are spherical and convexly shaped to match (complement) or agree with the shape of the concave notches 110. As shown, four holder contact surfaces 114a-114d protrude from respective angled corner surfaces 116 of the optical element 106. For clarity, in FIG. 1B the optical element 106 has hidden surfaces shown with dashed lines while hidden surfaces associated with the optical element holder 100 are not shown in FIG. 1B (but are illustrated in FIG. 1A).

The optical element holder 100 can resiliently deform allowing the optical element holder 100 to be bent and folded in an arbitrary manner, further allowing the receiving portions 108 to become temporarily displaced from the optical element 106 during optical element replacement and/or assembly of the optical element 106 in the housing 100. The receiving portions 108 can also be made from the same material as the remainder of the holder housing 102 so as to provide a similar deformative resilience. With the temporary displacement, the optical element 106, which is typically a rigid transparent object, can be easily inserted into the central region 104 in communication with the aperture 105 so that the holder contact surfaces 114 are received by the concave notches 110. The concave notches 110 can return to an original position before the displacement or to a new displaced position. The optical element 106 is frictionally supported and held in a suitable predetermined position by the optical element holder 100 and is free to controllably vibrate at a higher vibrational efficiency than conventional optical element holding arrangements. Further, in certain embodiments, the elastomeric construction of the optical element holder 100 provides a housing for the optical element with improved damping and higher performance efficiency in applications where the optical element 106 is driven as part of a PEM system. In such applications, the deleterious vibrational effects that can be transferred to the housing of the optical element and to the interior region of the housing can be reduced relative to traditional rigid housings (e.g., formed from metals, alloys, or other such rigid structures).

Representative applications for the optical element holder 100 include cushionably and frictionally supporting the optical element 106 in various photoelastic modulating devices, including ellipsometers and CD (circular dichroism) analyzers. The optical element 106 can be transparent, semi-transparent, or opaque at different wavelengths, including in the visible range. Some examples of the optical element 106 can include non-linear optical crystals, phase plates, solid state media, resonators, diffractive elements, optical slides, optical filters, lenses, reflective elements, acousto-optic or electro-optic modulators, etc.

In representative examples, the optical element holder 100 includes a support member 118 that extends around the holder housing 102 so as to provide a structural continuity of the holder housing 102 and which can also define a holder base 120. The holder base 120 can include inward extending portions 122 that provide additional support for the optical element 106 but also forms a protective barrier for the optical element 106 in the central region 104 (e.g., during insertion, transport, and movement in relation to proximate rigid objects that can damage the optical element 106). The inward extending portions 122 can also provide an extended area for a bottom surface 124 that is situated to contact or align with an interior surface of an optical assembly housing (not shown) to provide further support for the optical element 106 that is cushionably held at the receiving portions 108.

The optical element holder 100 also includes a circumferential wall 126 that extends around at least a majority of the holder housing 102 but defines an interruption that forms an opening 128 in the holder housing 102. The circumferential wall 126 includes a thin member 129 adjacent to the opening 128 that is flexible and can be bent considerably due to its small thickness. The opening 128 is situated so that a transducer (e.g., a piezoelectric transducer) or other device (not shown) can be inserted through the opening 128 or otherwise coupled to the optical element 106. The opening 128 also creates opposing open member portions 130a, 130b in the circumferential wall 126 that can be gripped and bent elastically away from each other, indicated directionally with arrows 131 so that receiving portions 108a, 108b can be displaced in a similar manner as the thin member 129 is bent back on itself (e.g., during PEM assembly or optical element replacement). The receiving portions 108c, 108d also displace but typically to a lesser extent due to the continuity of the circumferential wall 126 along a closed side 132 opposite the opening 128. The displacement associated with the opening 128 and the resilience of the holder housing 102 allows the optical element 106 to be inserted into the central region 104 of the holder housing 102 so that the holder contact surfaces 114 can be aligned with the concave notches 110. A return displacement of the open member portions 130a, 130b produces a similar return displacement of the concave notches to frictionally and cushionably grasp the holder contact surfaces 114, with reduced vibrational translation to and/or from the optical element 106.

Figure 2:
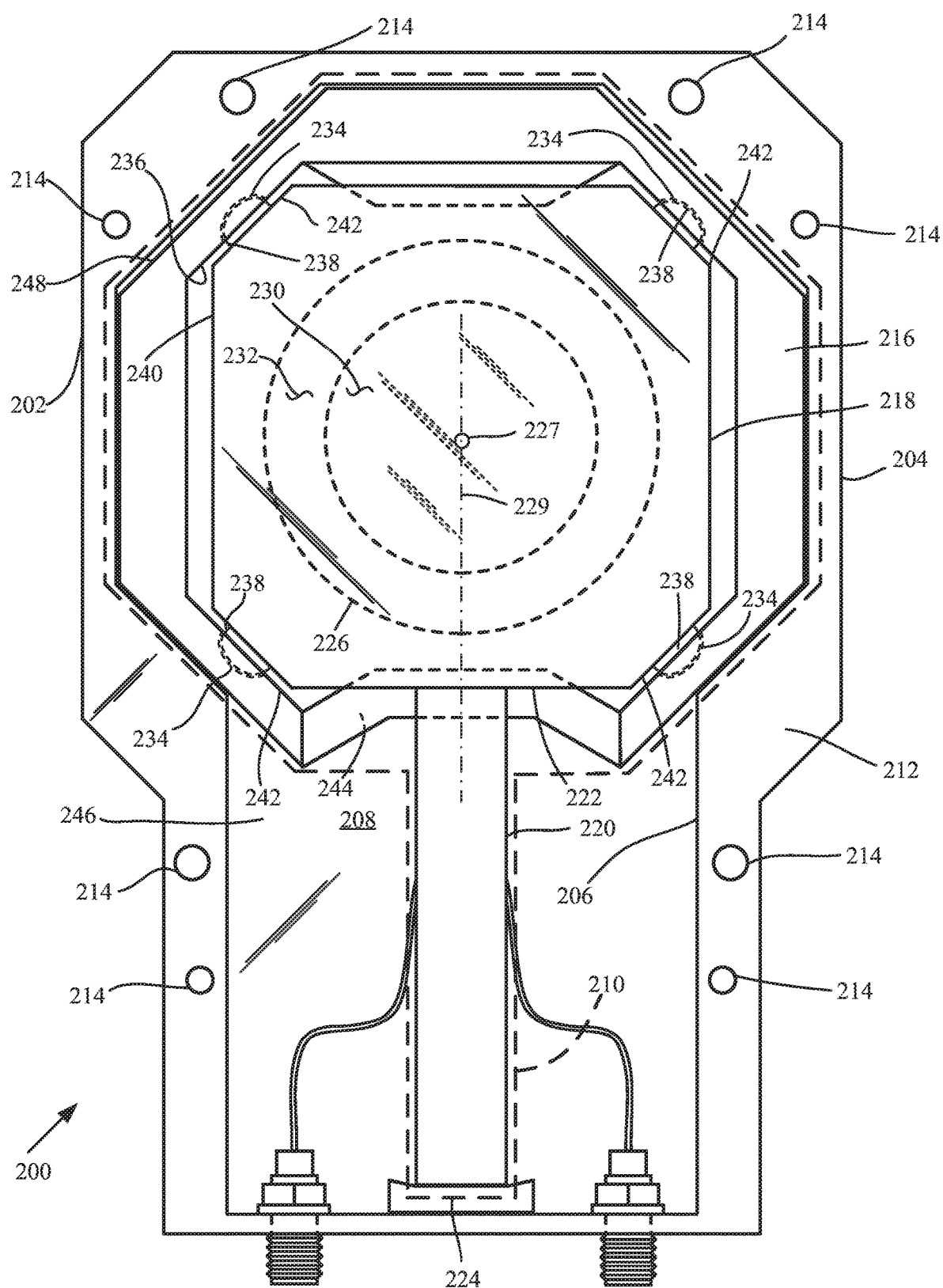
FIG. 2 is a plan view of an example of a photoelastic modulator assembly.

In FIG. 2, an example of a photoelastic modulator assembly 200 includes a housing 202 that is typically made of a rigid plastic or metal material and that includes an exterior surface 204 and an interior surface 206. The interior surface 206 can define an interior region (cavity) 208 in which a photoelastic modulator optical assembly 210 can be received. A lid (not shown) can attach to a top surface 212 of the housing 202 and secured with fasteners, e.g., at one or more fastener holes 214 so that the photoelastic modulator optical assembly 210 is secured in the interior region (cavity) 208. The photoelastic modulator optical assembly 210 includes flexible optical element holder 216 (which can be the optical element holder 100 in some examples), a photoelastic optical element 218 (e.g., optical element 106), and piezoelectric transducer 220 attached to a receiving surface 222 of the photoelastic optical element 218. The optical element holder 216, also referred to herein as a "sleeve") is configured to cushionably and removably support and hold a photoelastic optical element 218 in the housing 202 so that the piezoelectric transducer 220 can vibrate the photoelastic optical element at a characteristic frequency (e.g., frequencies in the range of 20 kHz to 100 kHz and higher) at high power efficiency. A transducer cushion 224 can also be situated between an end of the piezoelectric transducer 220 and the interior surface 206 to provide a protective cushion for the piezoelectric transducer 220. The high power efficiency is achieved through the cushionable support provided to the photoelastic optical element 218. The high power efficiency allows, for example, application of a lower voltage to the piezoelectric transducer or allows increases in driving amplitude. Thus, greater performance can be achieved from the same optical assembly, or smaller or more robust power supplies may be used. In some examples, by using the holder sleeve 216 additional absolute retardation cycles can be observed before noise reduces signal quality, thereby providing an improvement to applications preferring large amounts of absolute retardation or by allowing applications for longer wavelengths. In one example, the holder sleeve 216 allows for a decrease in driving voltage of about one third (e.g., 36 V decreased to 24 V) without decreasing PEM modulation amplitude. In another example, the holder sleeve 216 allows for an increase in PEM modulation amplitude, from 1200 nm to 2400 nm, without increasing a driving voltage.

The housing 202 also includes an aperture 226 on its lower surface adjacent to the photoelastic optical element 218 situated in the interior region 208. A lid aperture (not shown) is typically defined in the lid opposite the aperture 226 so as to define a measurement axis 227 exiting the plane of FIG. 2 and a corresponding optical path through the aperture 226 and photoelastic optical element 218. The piezoelectric transducer 220 extends perpendicularly with respect to the measurement axis 227 and parallel to an optical axis 229 of the photoelastic optical element 218 so that the photoelastic optical element 218 can be controllably vibrated to vary a strain of the optical element along the optical axis 229. In some examples, a transparent window 230 or filter extends over the aperture 226 and is situated within a rotatable ring 232 to protect the photoelastic modulator optical assembly 210 from debris and damage. The aperture 226 can be circular in shape so as to provide a rotatable path for flange mounting of the rotatable ring 232. In some embodiments, the rotatable ring 232 is rotatable about the measurement axis 227 so that the photoelastic modulator optical assembly 210 also is rotatable about the measurement axis 227 so as to vary the azimuth of the optical axis 229 (typically between 0° and 90°) according to different polarimetric application requirements. The rotatable ring 232 can be formed from any suitable materials, including plastic, metal, or alloy.

The optical element holder (holder sleeve) 216 includes four receiving portions 234 that are notched with a spherical concave shape formed into an interior surface 236 of the holder sleeve 216. The concave shape can be formed, e.g., in the process of extrusion printing the holder sleeve 216, so as to match and frictionally engage corresponding spherical convex supports 238 protruding from an exterior surface 240 of the photoelastic optical element 218. The convex supports 238 are typically made of a rigid material and attached, e.g., with adhesive, to corresponding angled side surfaces 242 of the photoelastic optical element 218. The convex supports 238 can be larger (as shown) or smaller than the respective receiving portion 234, and shapes other than convex are possible, such as conical, frustoconical, parallelpiped, cylindrical, etc., and the shapes need not correspond with an inverse shape of the receiving portions 234. For example, concave receiving portions can receive conical supports and conical depression receiving portions can receive convexly surfaced protrusions. In typical examples, the receiving portions 234 form depressions and corresponding surfaces of the convex supports 238 protrude from the photoelastic optical element 218. In some embodiments, depressions are formed in the photoelastic optical element 218 and the receiving portions 234 protrude from the holder sleeve 216.

A bottom surface 244 of the optical element holder 216 contacts a bottom surface 246 of the interior region 208 of the housing 202 so as to support the photoelastic modulator optical assembly 210. An exterior side surface 248 of the optical element holder 216 can form a snugly deformed or frictional fit with one or more portions of the interior surface 206 of the housing 202 so that the holder sleeve 216 remains tightly secured in the interior region 208 of the housing 202 and the photoelastic optical element 218 is cushionably supported for efficient photoelastic modulation. In some examples, the optical element holder (holder sleeve) 216 is suitably resilient so that the optical element holder 216 can be inserted into the interior region 208 for a snug fit with the bottom surface 246 and the interior surface 206, and the photoelastic optical element 218 can be inserted into the interior region 208 with the receiving portions 234 of the optical element holder 216 resiliently deforming to allow the insertion.

In further examples, the optical element holder 216, with or without the photoelastic optical element 218 inserted and cushionably held, can be affixed in the interior region 208. Additionally, for ease in assembly of the photoelastic modulator assembly 200, the photoelastic optical element 218 can be inserted and cushionably secured in the optical element holder 216 and the piezoelectric transducer 220 can then be affixed to the photoelastic optical element 218 in a selected position. The assembly of the optical element holder 216, photoelastic optical element 218, and piezoelectric transducer 220 can then be inserted into the housing 202. The shape and size of the optical element holder 216 and the housing 202 can be determined in relation to the size of the optical element 218 held by the optical element holder 216. Thus, different optical element holders (holder sleeves) 216 can hold optical elements 218 of different sizes in the same housing 202 by varying the dimensions associated with the receiving portions 234 while maintaining the dimension of the exterior side surface 248.

Figure 3A:
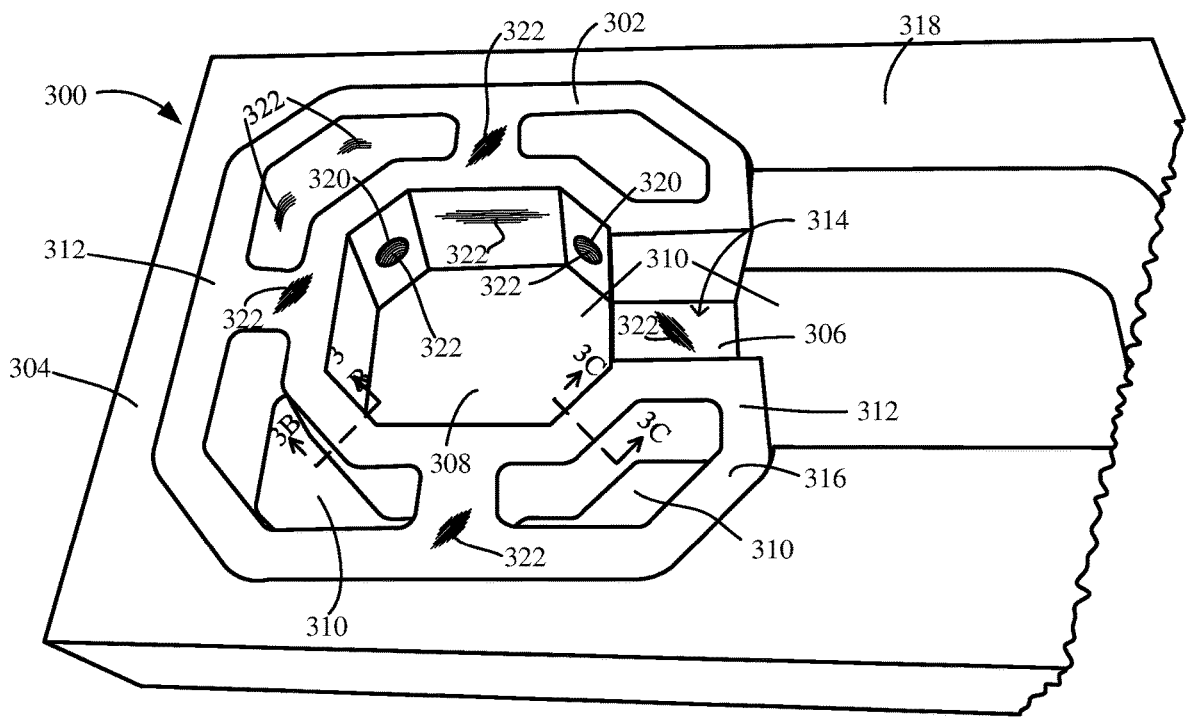
FIG. 3A is a perspective view of another example of a photoelastic modulator assembly.

FIG. 3A shows a photoelastic modulator assembly 300 that includes another resilient optical element holder 302 situated in a housing 304. For clarity, a portion of the housing 304 is omitted, represented by a jagged line. The optical element holder 302 includes a bottom member 306 that surrounds a central aperture region 308 and that is in contact with a bottom surface 310 of the housing 304. The optical element holder 302 also includes a top member 312 that partially surrounds the central aperture region 308 so as to define an opening 314 situated to allow a piezoelectric transducer (not shown) or other frequency controlled device insertion and connection or communication with an optical element (not shown) supported in the central aperture region 308. The top member 312 includes a top surface 316 that can be aligned with or near a top surface 318 of the housing 304. In some examples, a lid (not shown) can be secured to the top surface 318 so as to enclose the housing 304 and secure the optical holder 302 within. The top surface 316 of the top member 312 can be raised above the top surface 318 of the housing 304 so that the optical holder 302 can deform for a snug fit in the housing 304 with the lid secured to the top surface 318. The optical element holder 302 includes a plurality of concave displaceable receiving portions 320 situated to receive and frictionally engage (contact) corresponding convex portions on the optical element so that optical element can be cushionably held and supported by the optical element holder 302 in the central aperture region 308. In some examples, the housing 304 can receive separate optical element holders that can support optical elements of different size than the optical element supported by the optical element holder 302.

Any of the optical element holders disclosed herein (e.g., the optical element holder 100, the optical element holder 216, and/or the optical holder 302) can be made of an extruded resilient material that is 3-D printed. Suitable material includes the "ninjaflex" brand thermoplastic elastomer filament material manufactured by NinjaTek Corporation. Typically, during 3-D printing, a continuous thread of thermoplastic material is delivered to an extrusion head that heats the material and delivers the heated material to a surface in a controlled manner. The heated material fuses with adjacent material as it is delivered to a stage and multiple passes are performed in a controlled manner so that a three-dimensional object is formed. For instance, and using optical element holder 302 as an example, a plurality of elastically deformable filaments are fused to adjacent filaments during the 3-D printing process to create striated structures (examples of which are shown as 322) that form the body of the optical element holder 302. The adjacently fused filaments provide a resilience associated with flexure for the body of the optical element holder in addition to the resilience associated with the thermoplastic material itself. The diameter of the filaments can vary from embodiment to embodiment, with smaller diameters typically increasing printing duration and providing higher resolution for complex shapes. Further, and as more fully explained below, the in-fill percentage (fill density) and/or cross-section along the body of the optical element holder can also vary. In this regard, and in certain embodiments of the disclosed technology, the surfaces of the optical element holder (e.g., at the various walls that form the shape of the holder) are substantially continuous and have a high fill density (e.g., ≥90%, such as 100%) whereas the interior volume of the optical element holder has a lower fill density (e.g., <90%, <50%, <20%, <10%), effectively creating a semi-hollow or substantially hollow structure. The fill density of the interior is typically referred to as the "in-fill percentage".

Figure 3B:
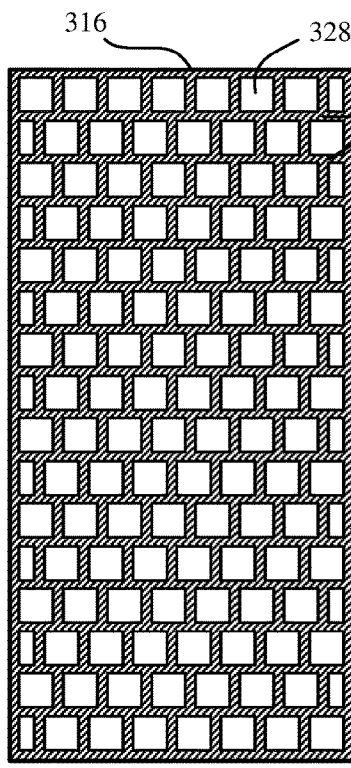
FIGS. 3B-3C are cross-sectional views of portions of the optical holder shown in FIG. 3A.
Figure 3C:
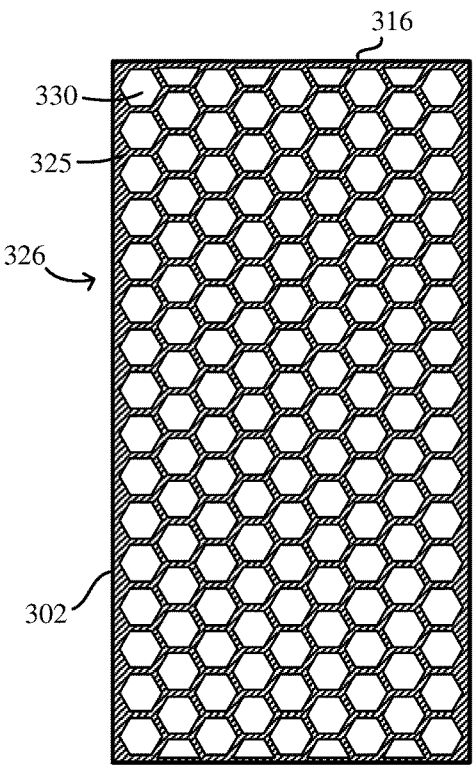

An example pair of optical holder cross-sections 324, 326 of the optical element holder 302 are shown with additional reference to FIGS. 3B-3C. Although this discussion is with reference to optical element holder 302, it applies to any of the optical element holders disclosed herein. The cross-section 324 includes striated members 325 (not necessarily oriented with the cross-hatching as shown) that provide a selected portion of the total area of the cross-section 324. The cross-section 324 includes a series of square-shaped voids 328 so that the ratio of the area of the striated members 325 to the total area of the cross-section 324 corresponds to an in-fill percentage of the cross-section 324. The square-shaped voids 328 have an alternating pattern, but the in-fill pattern can be other than alternating. The cross-section 326 includes striated members 327 forming a pattern of hexagonally-shaped voids 330. It will be appreciated that other in-fill patterns can be used, including triangular, rectangular, circular, etc., and in-fill patterns can vary from region to region in the optical holder 302, e.g., vary from the top member 312 to the bottom member 306. The in-fill pattern and percentage can be selected in relation to various performance parameters, such as oscillation efficiency and absolute retardance, associated with oscillation of the optical element situated in the optical holder 302. In some examples, in-fill percentages of about 5%, 10%, 15%, 25%, and 35% are used. Thus, a density and shape of the optical holder 302 can be selected to adjust performance associated with the optical element held by the optical holder 302. By holding the optical element firmly but not rigidly, the optical holder 302 holds the optical element so that the optical element is allowed to oscillate in improved fashion. In one example, fill density was varied so that a power reduction of 10% was achieved.

Figure 4A:
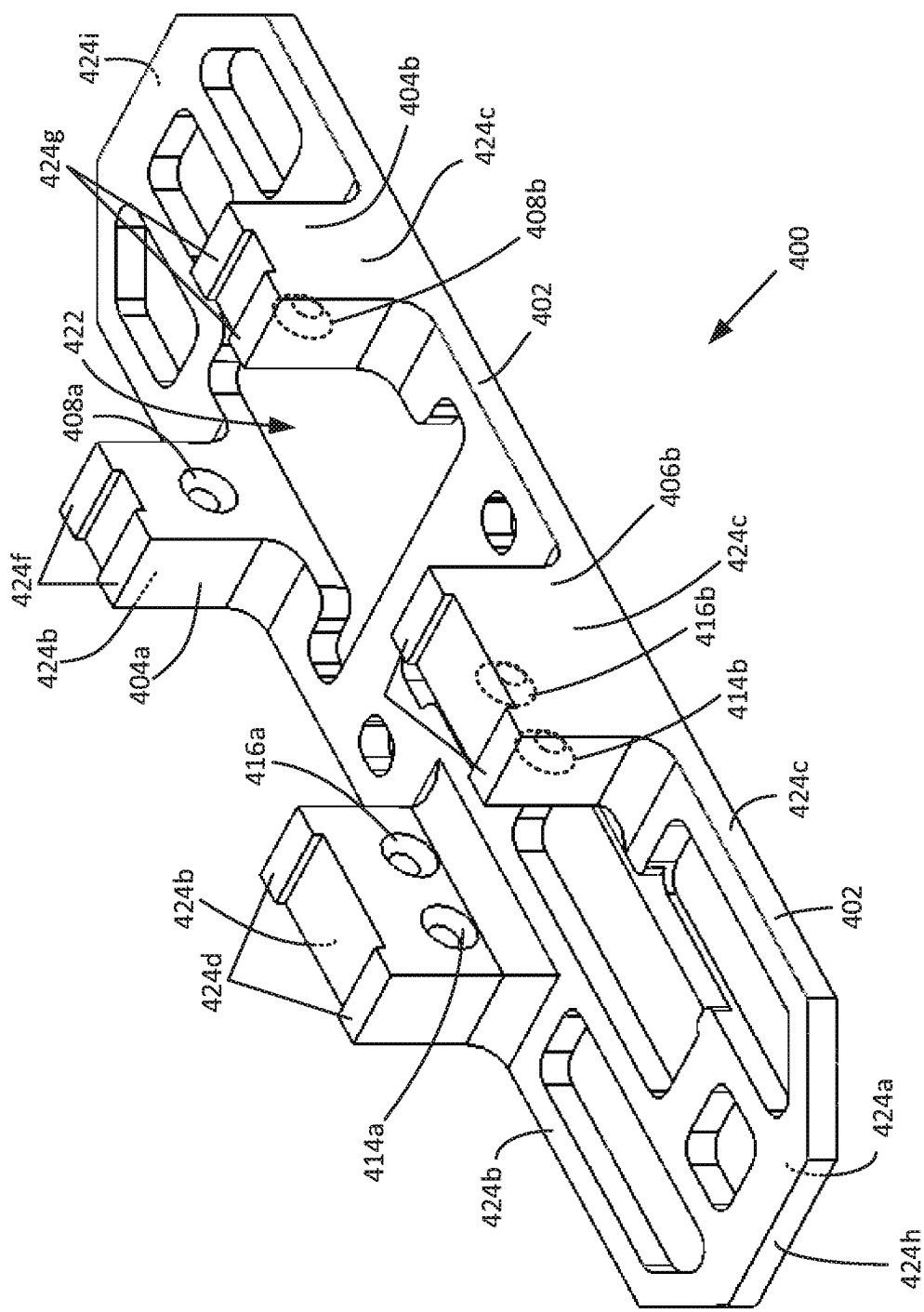
FIG. 4A is a perspective view of an example of a photoelastic modulator assembly holder.
Figure 4B:
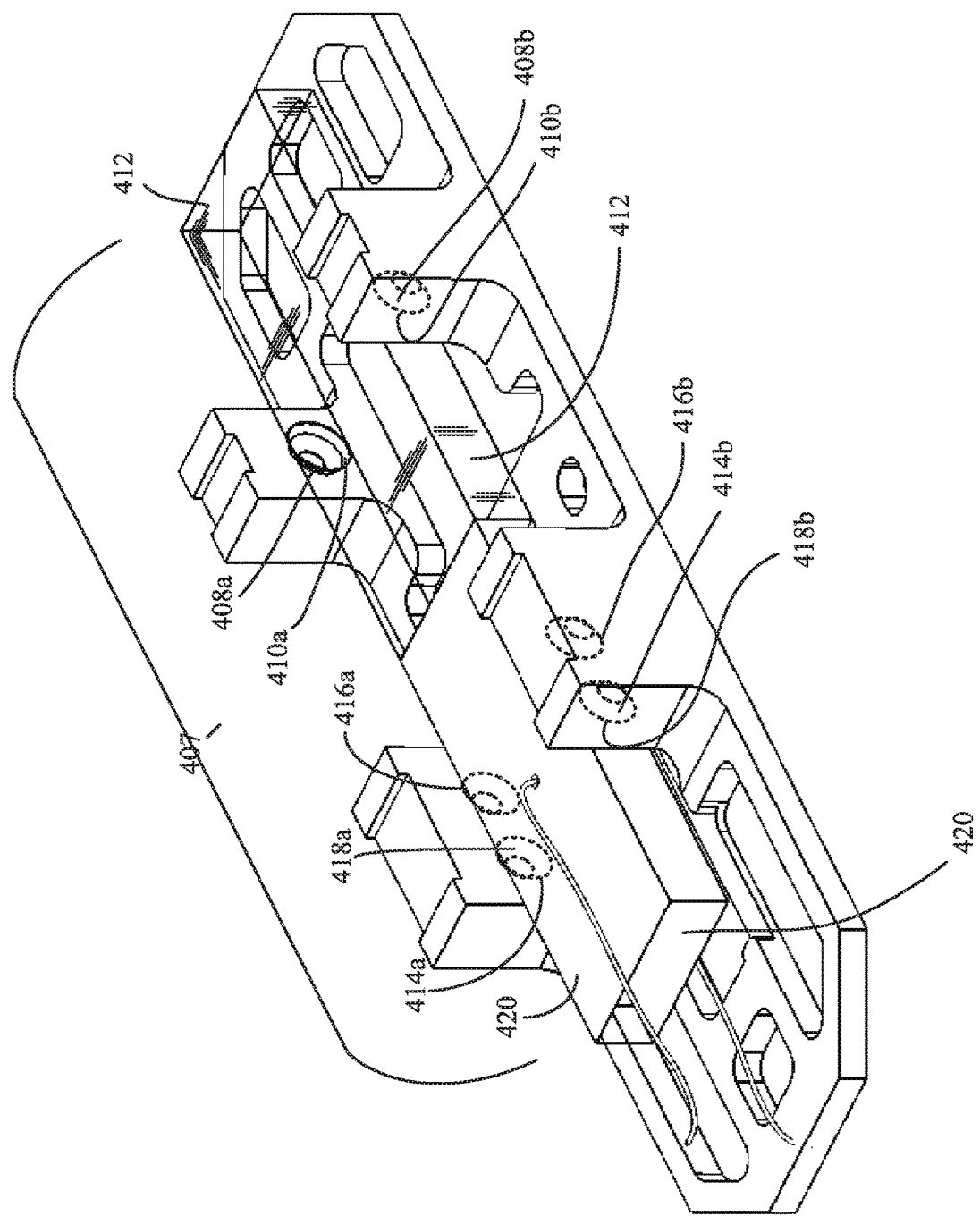
FIG. 4B is a perspective of the photoelastic modulator assembly holder of FIG. 4A holding a photoelastic modulator assembly.
Figure 5:
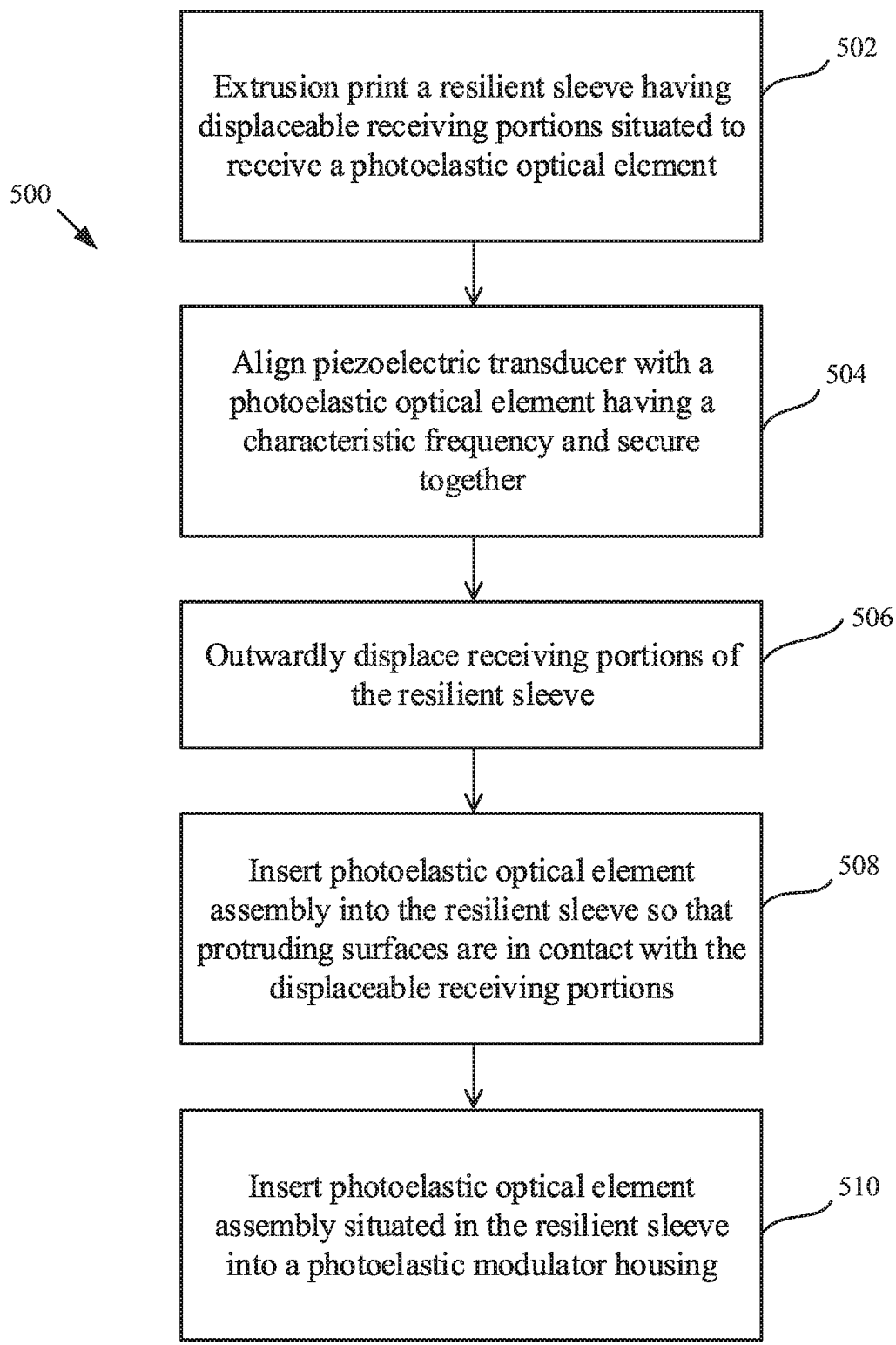
FIG. 5 is a flowchart of a method of inserting an optical element in an optical element holder.

FIGS. 4A and 4B show a photoelastic modulator assembly holder 400 that includes a base portion 402, and a first pair of vertical support members 404a, 404b and second pair of vertical support members 406a, 406b extending from the base portion 402. In representative embodiments, the photoelastic modulator assembly holder 400 is unitary and resilient so that various portions can flex and move so as to allow insertion and cushionable support of a photoelastic modulator assembly 407. Each of the vertical support members 404a, 404b includes a respective receiving portion 408a, 408b. The receiving portions 408a, 408b are oppositely situated and associated with respective protruding portions 410a, 410b of a photoelastic optical element 412 of the photoelastic modulator assembly 407 shown in FIG. 4B. The vertical support member 406a includes a plurality of receiving portions 414a, 416a and the vertical support member 406b includes an opposite plurality of receiving portions 414b, 416b. As shown in FIG. 4B, the opposing pair receiving portions 414a, 414b are situated to receive corresponding protruding portions 418a, 418b that protrude from a transducer block 420 coupled to the photoelastic optical element 412. The opposite plurality of receiving portions 416a, 416b is situated to receive corresponding protruding portions (not shown) for a photoelastic modulator assembly different from the photoelastic modulator assembly 407 and having a photoelastic optical element with a shorter length. Thus, the same photoelastic modulator assembly holder 400 can support various photoelastic modulator assemblies. The base portion 402 includes an opening 422 defining an aperture that is situated below the photoelastic optical element 412 with the photoelastic modulator assembly 407 cushionably supported by the receiving portions 408a, 408b, 414a, 414b and without contacting other portions of the photoelastic modulator assembly holder 400. In some examples, one or more side surfaces 424a-424i of the photoelastic modulator assembly holder 400 contact corresponding surfaces of a rigid housing (not shown) so as to provide support for the photoelastic modulator assembly 407 during oscillation of the photoelastic optical element 412 driven by the transducer 420. In FIG. 5, an example of a method 500 of manufacturing a photoelastic modulator includes extruding with a resilient extrusion printable elastomeric material a resilient optical element holder (sleeve) having displaceable receiving portions, at 502. For example, the resilient optical element holder (sleeve) can be 3-D printed with a selected resilient material, and an in-fill percentage of the resilient sleeve can be varied to correspond to an improved performance efficiency for operation of the photoelastic modulator. Efficiency improvements typically allow application of a lower voltage for a particular low-noise signal quality and reduced power requirements. At 504, a piezoelectric transducer is aligned with an optical axis of a photoelastic optical element having a characteristic photoelastic frequency and bonded to a corresponding surface of the photoelastic optical element. A photoelastic optical element assembly is formed so that photoelastic optical element can be controllably vibrated at the characteristic frequency. At 506 the receiving portions of the resilient optical element holder (sleeve) are displaced outwardly. At 508, the photoelastic optical element assembly is inserted into the resilient optical element holder (sleeve) so that protruding surfaces are in cushioned contact with the receiving portions. The resilient optical element holder (sleeve) cushionably supporting the photoelastic optical element and attached piezoelectric transducer is then inserted into and snugly secured in a rigid photoelastic modulator housing, at 510.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

We claim:

1. An apparatus comprising:
an elastically deformable optical element holder flexurally resilient throughout the holder and defining an interior aperture sized to receive an optical element having a plurality of holder contact surfaces, the optical element holder including a plurality of receiving portions located on interior-facing side walls and corresponding to respective ones of the holder contact surfaces of the optical element, each receiving portion being displaceable through elastic deformation of the elastically deformable optical element holder so that the optical element is insertable in the interior aperture such that it is cushionably supported and held in a predetermined position by the receiving portions in contact with the respective holder contact surfaces while allowing the optical element to be vibratably driven to achieve a photoelastic effect.

2. The apparatus of claim 1, further comprising the optical element inserted in the interior aperture and secured in the cushionably supported predetermined position by the optical element holder.

3. The apparatus of claim 1, wherein the optical element holder comprises a plurality of elastically deformable support members situated to form voids between adjacent support members so as to define one or more in-fill cross-sectional patterns.

4. The apparatus of claim 3, wherein the support members are made of a thermoplastic elastomer (TPE) material.

5. The apparatus of claim 4, wherein the thermoplastic elastomer material is an extrusion printable material.

6. An apparatus comprising:
an elastically deformable optical element holder defining an interior aperture sized to receive an optical element having a plurality of holder contact surfaces, the optical element holder including a plurality of receiving portions located on interior-facing side walls and corresponding to respective ones of the holder contact surfaces of the optical element, each receiving portion being displaceable through deformation of the optical element holder so that the optical element is insertable in the interior aperture so as to be cushionably supported in a predetermined position with the receiving portions in contact with the respective holder contact surfaces;
wherein the optical element holder comprises a plurality of elastically deformable support members situated to form voids between adjacent support members so as to define one or more in-fill cross-sectional patterns;
wherein a variation in the in-fill cross-sectional pattern between the one or more in-fill patterns is associated with a variation in driving efficiency of the optical element.

7. The apparatus of claim 6, wherein the one or more in-fill patterns includes one or more variable in-fill patterns.

8. The apparatus of claim 2, further comprising a transducer coupled to the optical element and situated to modulate a birefringence of the optical element so as to form a photoelastic modulator subassembly that includes the optical element holder, the optical element held by the optical element, and the transducer coupled to the optical element.

9. The apparatus of claim 8, further comprising a rigid housing having an interior region configured to receive at least a portion of the photoelastic modulator subassembly.

10. An apparatus comprising:
an elastically deformable optical element holder defining an interior aperture sized to receive an optical element having a plurality of holder contact surfaces, the optical element holder including a plurality of receiving portions located on interior-facing side walls and corresponding to respective ones of the holder contact surfaces of the optical element, each receiving portion being displaceable through deformation of the optical element holder so that the optical element is insertable in the interior aperture so as to be cushionably supported in a predetermined position with the receiving portions in contact with the respective holder contact surfaces;

wherein the optical element holder includes a closed bottom member extending around the optical element holder and an open top member defining an opening that provides access for insertion and attachment of a transducer to a selected surface of the optical element facing the opening and that allows deformation of the top member in an outward direction from the center of the optical element holder and corresponding displacement of the receiving portions so that the optical element can be inserted in the aperture to be cushionably supported by the optical element holder.

11. The apparatus of claim 10, further comprising a rigid housing situated to receive the optical element holder, the rigid housing including a plurality of interior support sidewalls corresponding to a plurality of exterior sidewalls of the optical element holder that are adjacent to the open top member.

12. An apparatus comprising:
an elastically deformable optical element holder defining an interior aperture sized to receive an optical element having a plurality of holder contact surfaces, the optical element holder including a plurality of receiving portions located on interior-facing side walls and corresponding to respective ones of the holder contact surfaces of the optical element, each receiving portion being displaceable through deformation of the optical element holder so that the optical element is insertable in the interior aperture so as to be cushionably supported in a predetermined position with the receiving portions in contact with the respective holder contact surfaces; and
a rigid housing situated to receive the optical element holder, the rigid housing including a plurality of interior support sidewalls defining a housing interior region and one or more distances between at least one surface of the optical element and at least one of the interior support sidewalls that is associated with an out-of-phase relationship with a driving oscillation frequency of the optical element.

13. The apparatus of claim 12, wherein the rigid housing is situated to receive a separate elastically deformable optical element holder defining a separate interior aperture sized to receive a separate optical element having a larger or smaller dimension than the optical element and having a corresponding driving oscillation frequency that is different from the optical element.

14. The apparatus of claim 1, wherein the optical element holder includes a separate plurality of receiving portions located on interior-facing side walls and corresponding to respective ones of separate holder contact surfaces of a separate optical element, each separate receiving portion being displaceable through deformation of the optical element holder so that the separate optical element is insertable in the interior aperture so as to be cushionably supported in a predetermined position with the separate receiving portions in contact with the respective separate holder contact surfaces.

15. The apparatus of claim 1, wherein the holder contact surfaces are convex protrusions extending outward from the optical element and the receiving portions are concave indentations shaped to match the convex protrusions.

16. The apparatus of claim 1, wherein the optical element holder has a Shore A durometer hardness of less than or equal to 80.

17. The apparatus of claim 1, wherein the optical element holder has a curved exterior surface.

18. A method, comprising:
inserting a photoelastic modulator optical element, having a plurality of holder contact surfaces, in an aperture of an elastically deformable optical element holder flexurally resilient throughout the holder having a plurality of receiving portions adjacent to the aperture and respectively corresponding to the holder contact surfaces, the inserting including elastically displacing at least one of the receiving portions so that the receiving portions contact the respective holder contact surfaces and the optical element is cushionably supported and held by the elastically deformable optical element holder in a predetermined position while allowing the optical element to be vibratably driven to achieve a photoelastic effect.

19. The method of claim 18, further comprising, inserting the optical element holder in an interior region of a rigid photoelastic modulator housing having a one or more interior rigid supporting sidewalls dimensioned to correspond with one or more exterior elastic sidewalls of the optical element holder.

20. The method of claim 18, further comprising vibrating the optical element with a transducer coupled to the optical element so as to modulate a birefringence characteristic of the optical element.

21. The method of claim 20, further comprising directing a sample beam through the aperture and the optical element so as to change a polarization of the sample beam along one or more axes.

22. The method of claim 18, further comprising attaching a transducer to the optical element with the optical element cushionably supported by the optical element holder.

* * * * *